United States Patent
Ohura et al.

(10) Patent No.: US 6,692,156 B1
(45) Date of Patent: Feb. 17, 2004

(54) ROLLING BEARING

(75) Inventors: Yukio Ohura, Fujisawa (JP); Akio Fujii, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/585,319

(22) Filed: Jun. 2, 2000

(30) Foreign Application Priority Data

Jun. 3, 1999 (JP) .......................... H11-156854

(51) Int. Cl.$^7$ ................. F16C 19/00; F16C 33/38

(52) U.S. Cl. ..................... 384/523; 384/533

(58) Field of Search ................. 384/523, 533, 384/572

(56) References Cited

U.S. PATENT DOCUMENTS

| | | | | | |
|---|---|---|---|---|---|
| 3,199,935 A | * | 8/1965 | Pitner | .......................... | 384/573 |
| 3,429,626 A | * | 2/1969 | Teufel | .......................... | 384/572 |
| 3,918,778 A | * | 11/1975 | Jacobson et al. | ........... | 384/523 |
| 4,040,686 A | * | 8/1977 | F'Geppert | ................... | 384/527 |
| 4,386,811 A | * | 6/1983 | Heemskerk et al. | ........ | 384/523 |
| 6,170,993 B1 | * | 1/2001 | Hurrell, II et al. | .......... | 384/572 |

* cited by examiner

*Primary Examiner*—William C. Joyce
(74) *Attorney, Agent, or Firm*—Crowell & Moring LLP

(57) ABSTRACT

The pockets 61 to 72 in the bearing 3 are arranged along the circumference (A), and the central points ($P_1$~$P_{12}$) of the pockets 61 to 72 are displaced from the uniform arrangement points of the pockets, that is from the central points on the circumference (A) of the pockets 61 to 72 when the arrangement space of the pockets 61 to 72 is uniform, on the side remote from the reference point ($P_0$) on the circumference (A).

8 Claims, 5 Drawing Sheets

ROLLING BEARING

FIELD OF THE INVENTION

The present invention is related to a cage of a rolling bearing, specifically to a rolling bearing which is low in non-repeatable runout and proper as the bearing for the spindle of a hard disc (HDD), a machine tool shaft, etc.

BACKGROUND OF THE INVENTION

Rotation in a rotating device using the bearing causes more or less vibrations. The conditions of vibration required to the rotating device are becoming more severe year by year. For example, the spindle motor for driving an HDD is required to be highly precise in non-repeatable runout (vibration which does not synchronize with the rotation), in a degree of less than 0.1 µm. The rotation precision of the shaft in a precision lathe, the size of which is larger than the motor for driving the HDD, is required to be substantially the same as in the motor for driving the HDD.

In the case of the machine tool shaft, there is a problem of the non-repeatable runout as in the motor for driving the HDD. Specifically, with the repeatable runout (vibration which synchronizes with the rotation), the processed surface is continuous and clean, but in the case of non-repeatable runout, the processed surface is rough with undulation, which reduces the quality of the processed surface.

The dominant vibration of the non-repeatable runout has a frequency fc (rotation cycle of the cage). This vibration (hereinafter referred to as "fc runout") occurs for example because there is a difference in diameter between the rolling elements within the cage, or because with respect to the arrangement space, the rolling elements in the bearing are displaced from uniform space arrangement during rotation.

If the rolling elements are not placed in a uniform space arrangement in the bearing during rotation, the fc runout (defined above) is caused due to the mechanism as follows. Specifically, under resilient contact between the preloaded rolling elements and the inner and outer races, a component of force is produced in the respective rolling elements to radially push the inner race. Then, if the rolling elements are not placed in a uniform space arrangement in the bearing during rotation, the vector sum (ΣF) of these components of force is not zero. As a result, the axis position is changed during rotation to produce the fc runout.

With the recent improvement of process technology, it becomes possible for example to process rolling elements in the precision of several tens of nanometers (nm). Consequently, the deviation from the spherical form of balls for the rolling elements is high, so that the differences in diameter between the rolling elements are very small.

Moreover, in the case of a cage of the inner race guide type, if the weight of the cage is not uniform in the circumferential direction, the shaft is subjected to rotation load due to the non-uniformity of weight. This also causes fc runout, which, however, can be reduced sufficiently by making the cage from a light material such as synthetic resin.

Accordingly, recently, the main reason of fc runout is the displacement of rolling elements from the uniform space arrangement in the bearing during rotation. It should be noted however that even if the cage is produced with a precisely uniform arrangement space for the pockets, once the cage is radially moved in the bearing, with respect to the arrangement space, the rolling elements may be displaced from the uniform space arrangement in the bearing during rotation.

Accordingly, conventionally, not only the arrangement space of rolling elements is precisely uniform, but also the guide gap is small in the cage, so that the radial movement of the cage is kept small to achieve a uniform space arrangement in the rolling elements in the bearing during rotation.

However, in the prior art technology as mentioned above, the cage is radially movable in the bearing by a small limited amount, and therefore inconvenience such as seizure is caused particularly at high speed rotation, which is a problem.

SUMMARY OF THE INVENTION

An objective of the present invention is to provide a cage taking the problem in the prior art technology into consideration with the guide gap being sufficiently secured, when the cage is radially moved in the bearing during rotation, with respect to the arrangement space, the rolling elements in the bearing are substantially in the uniform space arrangement.

BRIEF DESCRIPTION OF THE INVENTION

DETAILED DESCRIPTION OF THE INVENTION

Figure 1:
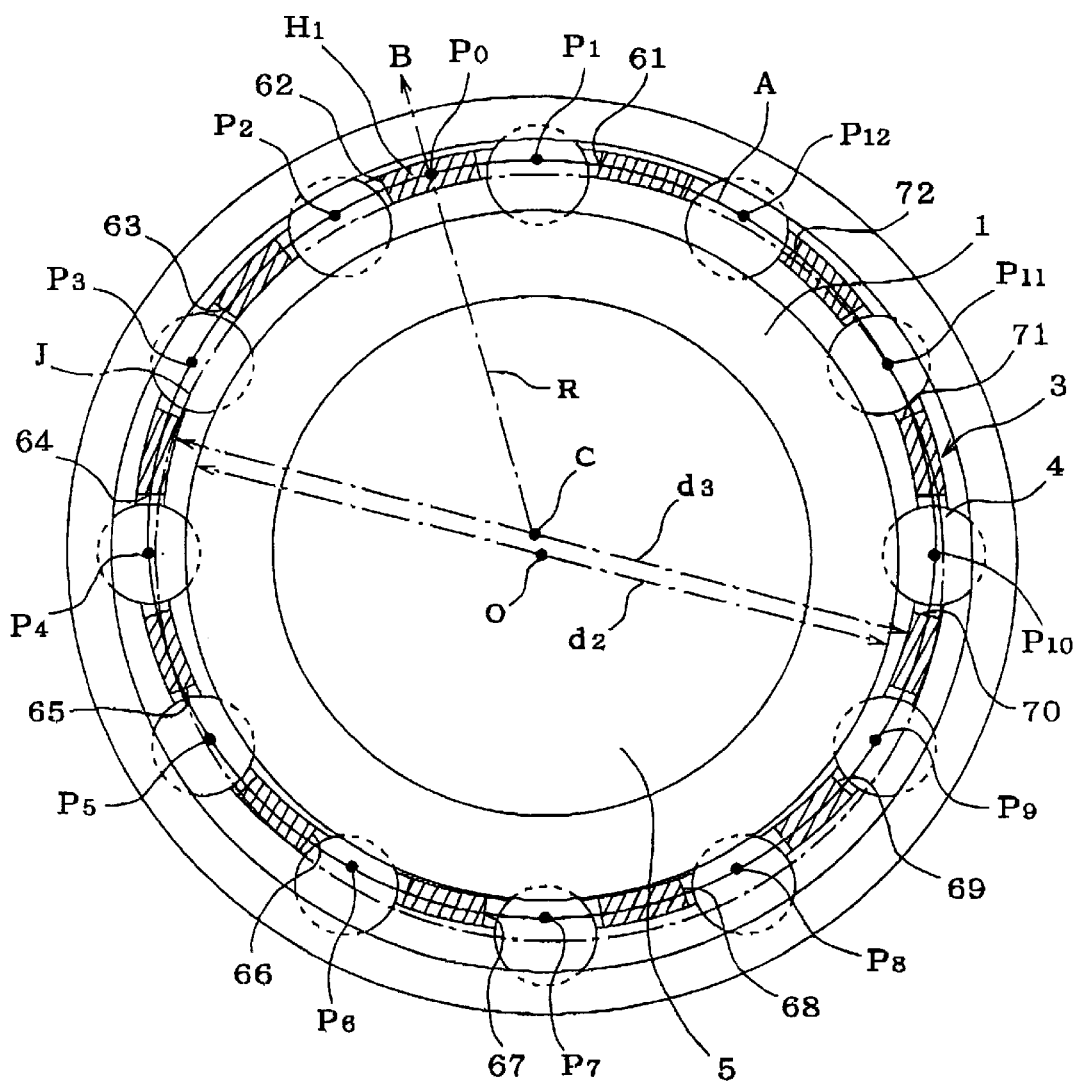
FIG. 1 is a front elevational view of the rolling bearing according to a first embodiment of the present invention wherein only the cage is shown in cross section.

The rolling bearing provided by the present invention has outer and inner races, rolling elements and a cage which is provided between the outer and inner races around an axis and has pockets arranged in a circumference concentric with the axis wherein the rolling elements are kept in the pockets, respectively.

In a feature of the rolling bearing of the present invention, the pockets in the cage are formed such that, provided that a reference point of the cage is placed at a point on the circumference, when the cage is radially moved in the bearing in a direction of the line connecting the reference point and the bearing center to each other, at least one rolling element is placed at a position for the uniform space arrangement.

In another feature of the rolling bearing of the present invention, the pockets in the cage are formed such that provided that a reference point of the cage is placed at a point on the circumference, and provided that the central point of the respective pockets on the circumference is equal to the uniform arrangement point of the pockets when all of the pockets are arranged with a uniform gap therebetween, the central point of at least one pocket is displaced from the corresponding uniform arrangement point of the pockets on the side remote from the reference point.

With the rolling bearing, provided that the cage in the bearing is radially movable by an amount ($\alpha$) from the state where the rotation center of the cage coincides with the rotation center of the bearing, and provided that the arc on the circumference for connecting the reference point to the uniform arrangement point of the pockets has a central angle ($\theta$), it is desirable that the displacement amount (L) of the respective pockets is set in a relation of $L=\alpha \cdot \sin \theta$.

Here, in the case of the cage of the inner race guide type, the amount ($\alpha$) is ($\delta/2$) wherein ($\delta$) is the guide gap that is the difference between the diameter of the cage guide surface of tie inner race and the diameter of the guide surface of the cage. This is because the maximum of the amount by which the cage is radially movable in the opposite directions, with 180 degree difference therebetween, from the state where the rotation center of the cage coincides with the rotation center of the bearing is a half of the guide gap.

In another feature of the rolling bearing of the present invention, the pockets in the cage are formed such that provided that a reference point of the cage is placed at a point on the circumference, as the pocket location is more separated from the reference point, the circumferential length of the pockets is longer.

The following are a process to set the reference point.

If the weight of tile cage is not uniform in the circumferential direction, the cage is eccentric in position toward the larger weight side to rotate in a spiral manner and to radially move in the direction of the line collecting the bearing center and the maximum weight location to each other. Accordingly, for example, in the case of the cage that is formed by making a ring and then forming holes for the pockets in the ring, the circumferential weight non-uniformity of the ring before forming the pockets is measured, and the reference point is set at the maximum weight location.

If the weight of the ring is substantially uniform in the circumferential direction, the pockets can be formed by setting the reference point at any point on the circumference as in the features as mentioned above. In the cage having the pockets formed as mentioned above, the side remote from the reference point on the circumference is lighter in weight, and therefore the maximum weight location is at the reference point. Accordingly, except for the case where the cage is formed through a process of making a ring and then forming pockets in the ring, e.g. through a synthetic resin injection molding, the reference point can be set at any point on the circumference.

Now, FIG. 1 shows a rolling bearing of a first embodiment of the present invention, where the rolling bearing comprises an inner race 1, an outer race 2, a cage 3 illustrated in cross section, rolling elements, specifically balls 4, and a shaft 5. The cage has a geometric center (C), and the bearing shaft has a rotation center (O), which are illustrated in FIG. 1 such that tile geometric center (C) of tile cage 3 is displaced, e.g. at a location represented by ($C_2$) later, from the rotation center (O) of the shaft 5 for easy understanding.

The cage 3 is guided by the outer peripheral surface of the inner race 2, and there is a guide gap ($\delta$) sufficient for smooth rotation of the cage 3. Here, $\delta=d_3-d_2$.

The cage 3 is made from a ring concentric with the shaft 5, in the circumferential surface of which twelve circular pockets 61 to 72 are arranged in the same size.

Specifically, the pockets 61 to 72 are arranged along the circumference (A) which is concentric with the shaft 5 when the geometric center (C) of the cage 3 coincides with the rotation center (O) of the shaft 5, in other words, when the geometric center (C) is located at $C_1$, and the central points ($P_1 \sim P_{12}$) on the circumference (A) of the pockets 61 to 72 are displaced from the uniform arrangement points of the pockets, that is from the central points on the circumference (A) of the pockets 61 to 72 when the arrangement space of the pockets 61 to 72 is uniform. The amount of this displacement is explained referring to FIG. 2.

Figure 2:
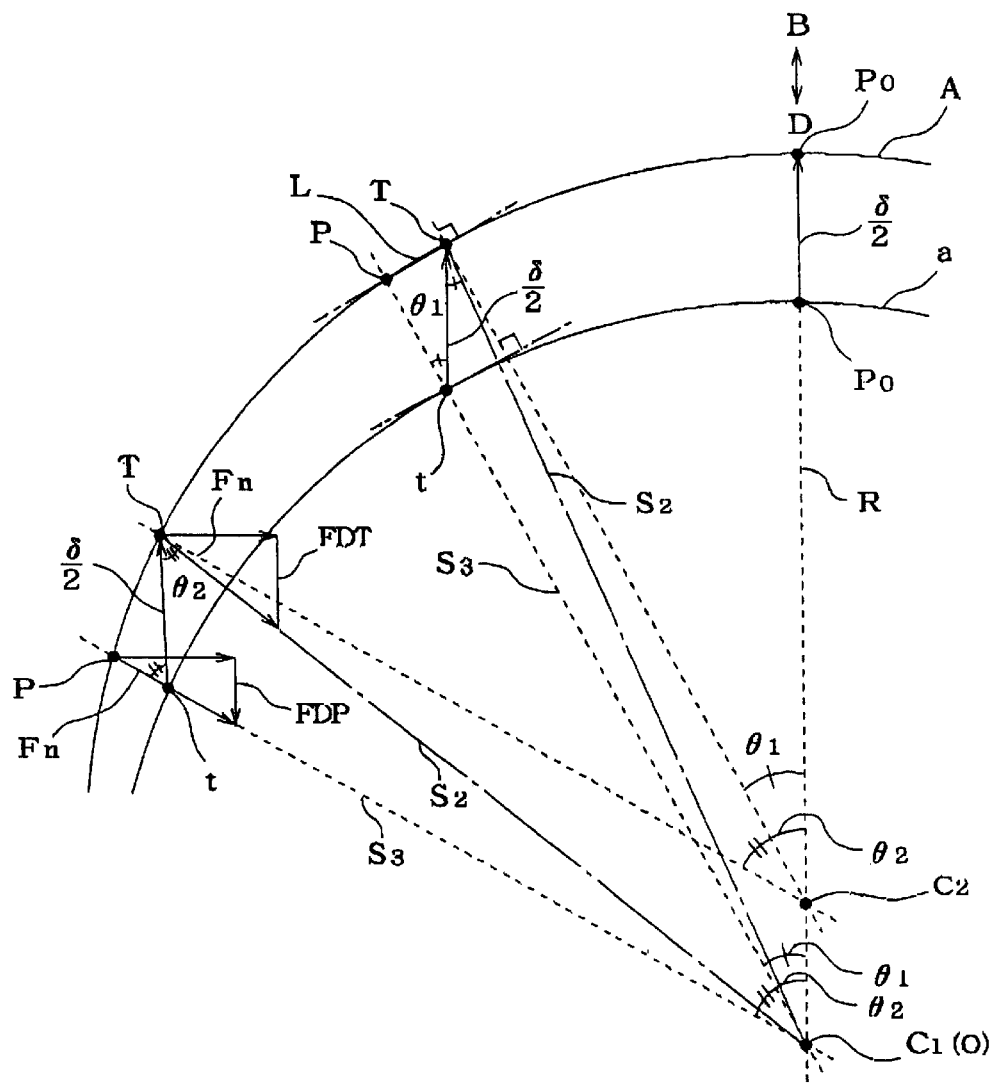
FIG. 2 is a diagram to show the pocket arrangement space of a cage according to the present invention.

In FIG. 2, the circumference (A) in FIG. 1 is around the center ($C_2$). In other words, the center of the circumference (A) is moved from the point ($C_1$) to the point ($C_2$) in FIG. 2. The pockets have their central points (P) arranged along the circumference (A). In this cage 3, the column ($H_1$) between the pocket 61 and the pocket 62 has a central point in the direction of the circumference (A) set at the reference point ($P_0$).

The central points (P) of the pockets are displaced from the corresponding uniform arrangement points (T) of the pockets on the side remote from the reference point ($P_0$). The amount (L) of this displacement is set in a relation of $L=\delta/2 \cdot \sin \theta$ provided that the cage 3 in the bearing is radially movable by the amount equal to a half of the guide gap ($\delta$) from the state where the geometric center (C) of the cage 3 coincides with the rotation center (O) of the bearing, and that the arc on the circumference (A) for connecting the reference point ($P_0$) to the uniform arrangement point (T) of the pockets has a central angle ($\theta$). In FIG. 2, the rotation center of the cage 3 when the geometric center of the cage 3 coincides with the rotation center (O) of the bearing is indicated by ($C_1$).

For example, the central point (P) of the pockets with the central angle ($\theta_1$) is displaced in position from the corresponding uniform arrangement point (T) of the pockets on the side remote from the reference point ($P_0$) by the amount of $L=\delta/2 \cdot \sin \theta_1$. Moreover, the central point (P) of the pockets with the central angle ($\theta_2$) is displaced in position from the corresponding uniform arrangement point (T) of the pockets on the side remote from the reference point ($P_0$) by the amount of $L=\delta/2 \cdot \sin \theta_2$.

In FIG. 2, the circumference (a), corresponding to the circumference (A), is for the state where the geometric center (C) of the cage is located at the point ($C_1$) which coincides with the rotation center (O) of the bearing. In other words, the circumference (A) in this state is represented by (a).

When the central point (P) of the pockets is arranged to coincide with the corresponding uniform arrangement point (T) of the pockets, the central point (t) of the pockets coincides with the corresponding uniform arrangement point (T) of the pockets in the state where the geometric center (C) at the point ($C_1$) of the cage coincides with the rotation center (O) of the bearing provided that the central point (t) of the pockets is located on the circumference (a). In FIG. 2, the central point (t) on the circumference (a) is located at the pocket uniform arrangement point (T) of the circumference (a).

However, when the cage 3 in the bearing is moved from the state where the geometric center (C) of the cage 3 coincides with the rotation center (O) of the bearing, specifically from the point ($C_1$), in the direction (B) along the radius (R) which connects the reference point ($P_0$) to the point ($C_1$), the central point (t) of the pockets moves in the direction (B) by the same amount. When this amount of movement is $\delta/2$, the circumference (a) after movement overlaps the circumference (A), and the central point (t) of the pockets overlaps the pocket uniform arrangement point (T) on the circumference (A). In this state, the pocket uniform arrangement point (T), on which the central point (t) is now located, is not at the uniform arrangement point with reference to the rotation center (O) of the bearing.

This is clear from the fact that the linear line ($S_2$) connecting the pocket uniform arrangement point (T) on the circumference (A) where the central point (t) is now located, to the rotation center (O) of the bearing does not coincide with the linear line ($S_3$) connecting the rotation center (O) of the bearing to the point (t) on the circumference (a) which is the uniform arrangement point with reference to the rotation center (O) of the bearing. And, there is the central point (P) of the pockets of the cage 3 of the present example on an extension of the linear line ($S_3$). In other words, the central point (P) of the pockets of the cage 3 is the uniform arrangement point with reference to the rotation center (O) of the bearing in this sate.

Accordingly, it would be clear that when the cage 3 is moved in the direction (B) by the maximum movement amount ($\delta/2$), the central points ($P_1$) to ($P_{12}$) of the pockets 61 to 72 of the cage 3 are located at the uniform arrangement point with reference to the rotation center (O) of the bearing.

FIG. 1 shows the state where the cage 3 in the bearing is moved in the direction (B) by the amount ($\delta/2$). In FIG. 1, the pitch circle of the balls 4 in this state is indicated by the single point chain line (J), and all the balls are positioned in the uniform arrangement with reference to the rotation center (O) of the bearing.

Accordingly, in this embodiment, when the cage 3 is moved in the direction (B) in the bearing as mentioned above, the balls 4 can be arranged with a uniform interval therebetween in the bearing during rotation while keeping a sufficient guide gap.

Figure 3:
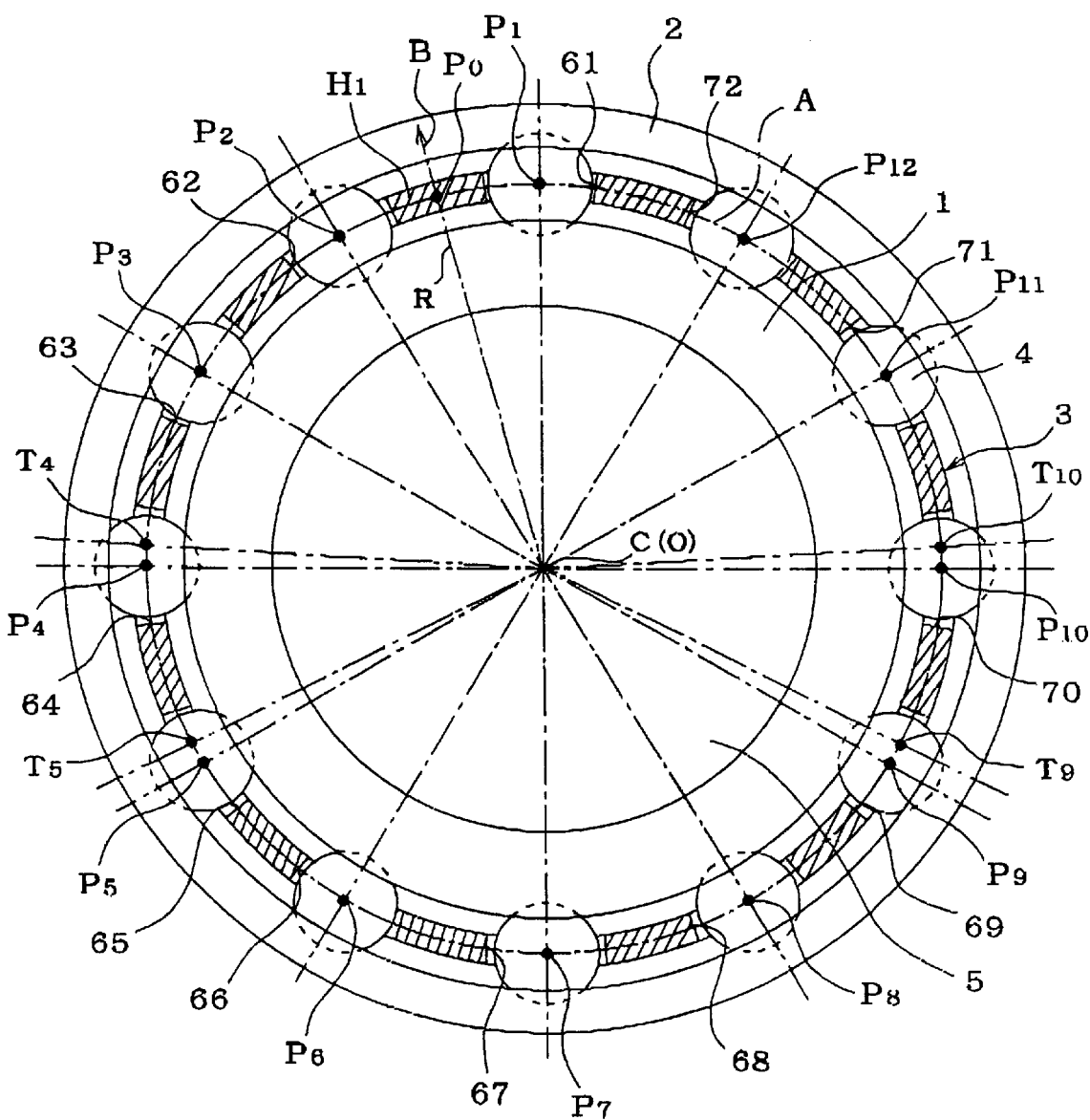
FIG. 3 is a front elevational view of the rolling bearing according to a second embodiment of the present invention wherein only the cage is shown in cross section.

FIG. 3 shows a second embodiment of the rolling bearing of the present invention. This cage is substantially the same to the cage in the first embodiment except for the arrangement of the pockets 61 to 72. Specifically, the second embodiment is different from the first embodiment in the arrangement of the pockets 61 to 72.

With this cage 3, except for the pockets 64, 65, 69, 70, the central point (P) of the remained pockets coincides with the corresponding uniform arrangement point (T). The central points ($P_4$, $P_5$, $P_9$, $P_{10}$) of the pockets 64, 65, 69, 70 are displaced from the corresponding uniform arrangement points ($T_4$, $T_5$, $T_9$, $T_{10}$) of the pockets on the side remote from the reference point ($P_0$).

Specifically, in this embodiment, different from the first embodiment, the central points on the circumference (A) of some of the pockets are displaced from the corresponding uniform arrangement points of the pockets.

Consequently, when the cage is moved in the direction (B) in the bearing, except for the central points ($P_4$, $P_5$, $P_9$, $P_{10}$) of the pockets 64, 65, 69, 70, the central point of the pockets ($P_1$ to $P_{12}$) is not placed at the uniform arrangement point with reference to the rotation center (O) of the bearing. In addition, the central points ($P_4$, $P_5$, $P_9$, $P_{10}$) of the pockets 64, 65, 69, 70 are not placed at the uniform arrangement point with reference to the rotation center (O) of the bearing unless the amount of displacement from the corresponding uniform arrangement point of the pockets coincides with the value of $L=\beta \cdot \sin\theta$, in relation to the movement amount ($\beta$) in the direction (B).

However, the central points ($P_4$, $P_5$, $P_9$, $P_{10}$) of the pockets 64, 65, 69, 70 are displaced from the uniform arrangement points ($T_4$, $T_5$, $T_9$, $T_{10}$) with reference to the rotation center of the cage 3, and therefore as an effect, the absolute value of the vector sum ($\Sigma F$) can be smaller when the cage 3 is moved in the direction (B) than in the case where the central points ($P_4$, $P_5$, $P_9$, $P_{10}$) coincide with the uniform arrangement points ($T_4$, $T_5$, $T_9$, $T_{10}$).

When the cage 3 in the bearing during rotation is moved along the radius (R) in the direction (B), the case where the central point of the pockets is displaced from the uniform arrangement point on the side remote from the reference point is different from the case where the central point of the pockets is placed at the uniform arrangement point in the magnitude of the component in the direction along the radius (R) of the force of the balls 4 at the respective positions to radially push the inner race even if the force is the same.

For example, in FIG. 2, the balls 4 are shown to radially push the inner race with the same force (Fn) at the non-uniform arrangement points (P) and at the uniform arrangement points (T). However, the magnitude of the component (FD) of the force (Fn) in the direction along the radius (R) at the point (P) is different from the magnitude of the component (FD) of the force (Fn) in the direction along the radius (R) at the point (T). Specifically, the component (FD) of the force at the points (P) and (T) is in the direction (D) opposite to the direction (B), specifically different by 180 degrees. And, the component (FDP) at the point (P) is smaller than the component (FDT) at the point (T).

Specifically, in the case where all the central points (P) of the pockets are placed at the uniform arrangement points (T) of the pockets, when the cage 3 is moved in the direction (B) in the bearing during rotation, the vector sum ($\Sigma F$) is not zero to produce a force in the direction (D) opposite to the direction (B). This force radially pushes the shaft 5 to cause the fc runout. On the other hand, as in this embodiment, when at least one of the central points (P) of the pockets is displaced from the uniform arrangement point (T) of the pockets, the component in the direction (D) of the force (Fn) at the central point (P) of the pockets is so small to reduce the absolute value of the vector sum ($\Sigma F$). As a result, the fc runout can be suppressed.

Figure 4:
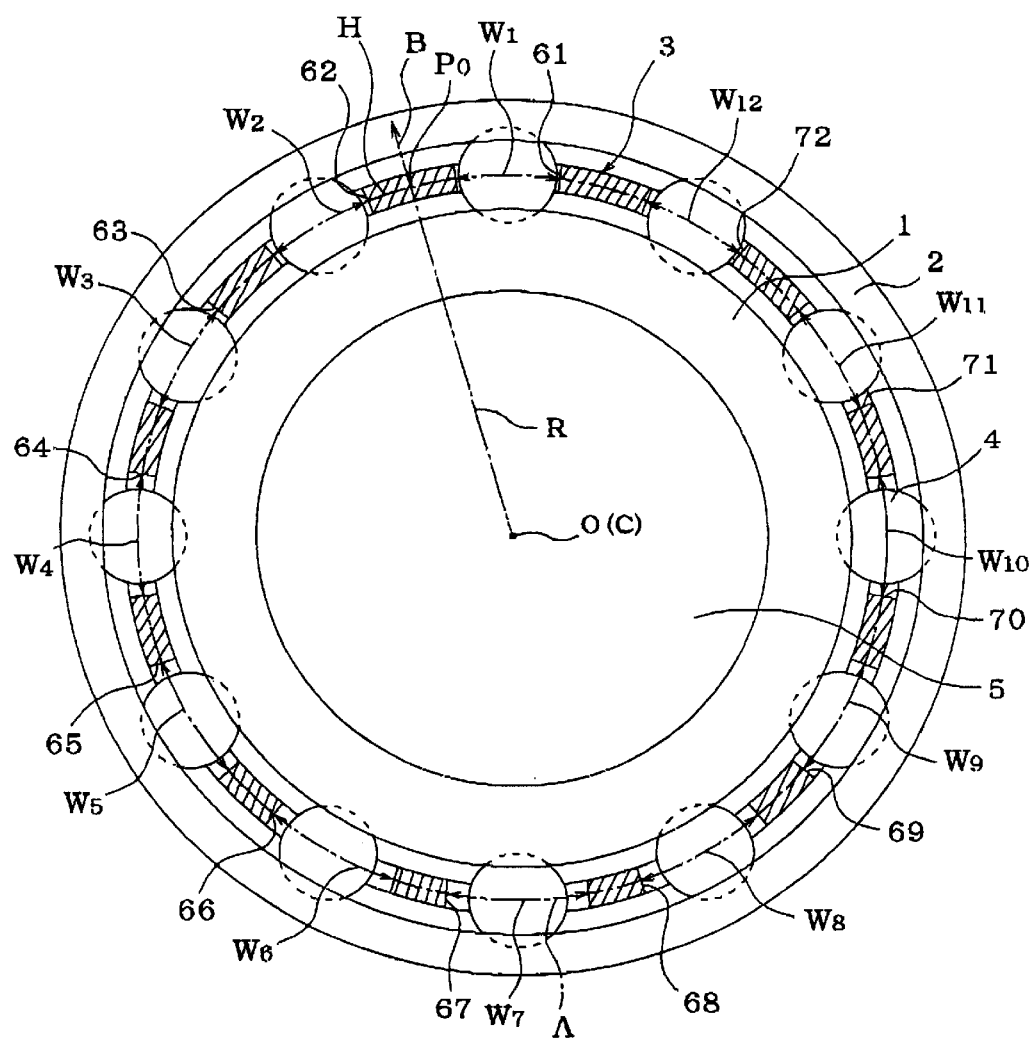
FIG. 4 is a front elevational view of the rolling bearing according to a third embodiment of the present invention wherein only the cage is shown in cross section.

FIG. 4 shows a third embodiment of the rolling bearing according to the present invention. The cage in this rolling bearing is substantially the same to the cage of the first embodiment except for the arrangement of the pockets 61 to 72 and for the circumferential length of the respective pockets 61 to 72.

With respect to the arrangement of the pockets 61 to 72 in this cage 3, all the central points of the pockets are placed at the uniform arrangement points of the pockets. It is set such that as tile pocket position is more separated from the reference point ($P_0$), the length ($W_1 \sim W_{12}$) of the pockets in the direction of the circumference (A) is larger. The length ($W_1$) of the pocket 61 is set at the value of the diameter of the balls 4 plus a predetermined gap. The length ($W_2 \sim W_{12}$) of tile pockets 62~72 is set at the length equal to the sum of the length ($W_1$) of the pocket 61 and a value corresponding to the respective pocket position represented by $L=\delta/2 \cdot \sin\theta_2$.

Accordingly, comparing with the conventional cage where all the central points of the pockets are placed at the uniform arrangement points of tile pockets, and tile length ($W_1 \sim W_{12}$) of all the pockets is the same to the length ($W_1$) without the value (L) being added, the balls 4 positioned in the pockets 61 to 72 of this cage 3 are inclined to be positioned at the uniform arrangement points with reference to the rotation center (O) of the bearing when the cage 3 is radially moved in the direction (B) in the bearing during rotation.

Incidentally, the weight center of the cage in this embodiment is displaced in the direction (B) from the geometric center of the cage, and therefore the cage is displaced in the direction (B) due to centrifugal force during the bearing rotation.

In the case of the cage 3 of this embodiment, when the cage 3 is moved in the direction (B) in the bearing, the balls 4 can be placed with a uniform space therebetween in the bearing during rotation while keeping a sufficient guide gap.

Incidentally, in the case of the cage where all the pocket center points are placed at the uniform arrangement points of the pockets, and the length ($W_1 \sim W_{12}$) of all the pockets is set at the same and large value (for example, ($W_7$) with the largest addition of component (L)), the balls 4 are inclined to be positioned at the uniform arrangement points with reference to the rotation center (O) of the bearing when the cage 3 is radially moved in the direction (B) in the bearing during rotation.

However, this cage has so large a pocket gap to cause large vibrations, and the vibrations cause a problem during high speed rotation. On the other hand, the length ($W_1 \sim W_{12}$) of the pockets in the cage 3 of the third embodiment is set to a required length, and therefore such vibrations are suppressed.

Incidentally, in the case where the weight of the cage is not uniform in the circumferential direction, the shaft is subjected to a load due to the centrifugal force caused by the non-uniformity in weight. This load is neglected in the embodiments above. But, it is possible to set the pocket arrangement space and the length in the circumference (A) of the pockets taking this load into consideration, thereby suppressing the fc runout due to the centrifugal force in the cage.

Moreover, in the embodiments above, the inner race is rotated, but the present invention can be applied to the bearing where the outer ring is rotated.

Moreover, in the embodiments above, the cage is guided by the inner race, but the cage can be guided by the outer race or by the rolling elements, resulting in the substantially same effect.

Figure 5:
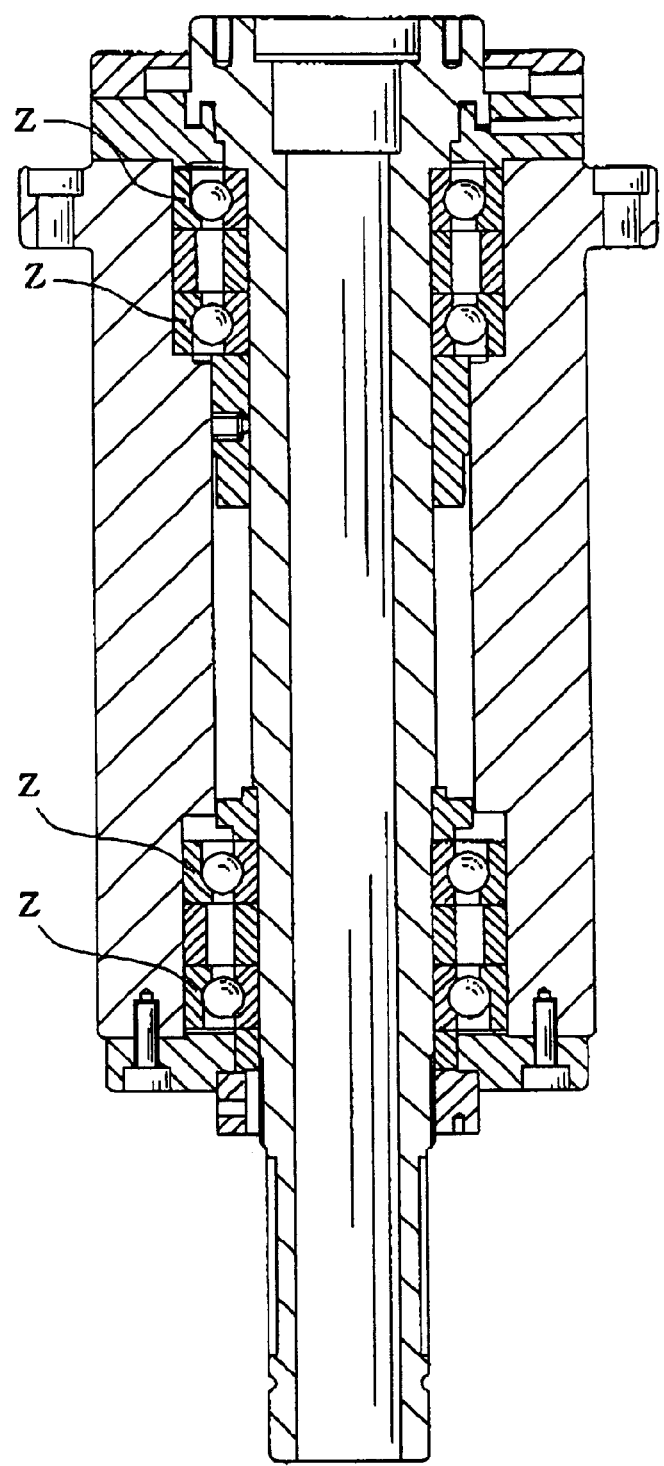
FIG. 5 is a cross sectional view of a spindle with reduced non-repeatable runout by way of using the rolling bearing of the present invention.

Moreover, the rolling bearing (Z) of the present invention can be used in the spindle as shown in FIG. 5 to obtain a low vibration spindle with less non-repeatable runout.

According to the rolling bearing of the present invention, the idea that the pocket arrangement space of the bearing is displaced from the conventional uniform space arrangement, so that when the cage is radially moved with keeping the guide gap sufficiently in the bearing during rotation, the arrangement space of the rolling elements can be arranged in the uniform space arrangement in the bearing. As a result, problems such as seizure during high speed rotation would not be caused and the fc runout of the rotation device can be suppressed.

What is claimed is:

1. A rolling bearing comprising a shaft, outer and inner races, rolling elements and a cage which is provided between the outer and inner races around the shaft and has pockets arranged in a circumference concentric with the shaft wherein the rolling elements are kept in the pockets, respectively, the pockets being formed such that when the cage is radially moved in the rolling bearing in a direction from the center of the rolling bearing to a reference point placed in the cage at a point on the circumference thereof with all or almost all of the rolling elements separated from a line through the center of the rolling bearing in the direction of cage movement, at least one of the rolling elements separated from the line is placed in the rolling bearing at a position for a uniform space arrangement.

2. The rolling bearing of claim 1, wherein, when the pockets are arranged on the circumference with a uniform space therebetween, the central point of each of the pockets is located at a pocket uniform arrangement point, the pockets of the cage are formed such that at least one pocket has a central point displaced from its pocket uniform arrangement point on the side remote from the reference point.

3. The rolling bearing of claim 2, wherein when the cage in the bearing is radially movable by an amount ($\alpha$) from the position where the rotation center of the cage coincides with the rotation center of the bearing, and provided that an arc which connects the reference point to a pocket uniform arrangement point on the circumference has a central angle ($\theta$), the displacement amount (L) of the at least one pocket is represented by the relationship $L = \alpha \cdot \sin \theta$.

4. The rolling bearing of claim 1, wherein each of the rolling elements separated from the line are placed in the rolling bearing at a position for a uniform space arrangement.

5. The rolling bearing of claim 1, wherein said at least one rolling element separated from the line for a uniform space arrangement is movable in an orthogonal direction to the direction of cage movement.

6. The rolling bearing of claim 1, wherein said at least one rolling element separated from the line for a uniform space arrangement is movable in an orthogonal direction to said line.

7. The rolling bearing of claim 1, wherein said at least one rolling element separated from the line for a uniform space arrangement is movable in an orthogonal direction to a direction of the center of the rolling bearing to the reference point.

8. The rolling bearing of claim 1, wherein each of the rolling elements separated from the line are placed in the rolling bearing at a position for a uniform space arrangement and are movable in an orthogonal direction to the direction of cage movement.

* * * * *